United States Patent
Kim

(10) Patent No.: US 7,743,873 B2
(45) Date of Patent: Jun. 29, 2010

(54) VARIABLE RACK STROKE SYSTEM FOR VEHICLE

(75) Inventor: Jong-Sung Kim, Yongin-si (KR)

(73) Assignee: Kia Motors Corporation, Seoul (KR)

( * ) Notice: Subject to any disclaimer, the term of this patent is extended or adjusted under 35 U.S.C. 154(b) by 465 days.

(21) Appl. No.: 11/647,073

(22) Filed: Dec. 28, 2006

(65) Prior Publication Data

US 2008/0106048 A1 May 8, 2008

(30) Foreign Application Priority Data

Nov. 3, 2006 (KR) .................. 10-2006-0108194

(51) Int. Cl.
- *B62D 5/14* (2006.01)
- *B62D 3/00* (2006.01)
- *B62D 5/00* (2006.01)

(52) U.S. Cl. .............. 180/421; 180/422; 180/428; 280/89; 280/93.513; 280/93.514

(58) Field of Classification Search ........ 280/89–89.12, 280/92, 93.5, 93.501, 93.502, 93.51, 93.513, 280/93.514; 180/421, 422, 428; *B62D 3/00, B62D 3/02*

See application file for complete search history.

(56) References Cited

U.S. PATENT DOCUMENTS

| | | | | |
|---|---|---|---|---|
| 6,578,862 B2 * | 6/2003 | Park et al. | | 280/444 |
| 6,588,770 B1 | 7/2003 | Lee | | |
| 7,438,154 B2 * | 10/2008 | Lim | | 180/422 |
| 7,445,080 B2 * | 11/2008 | Ryu | | 180/428 |
| 2006/0151235 A1 * | 7/2006 | Chikaraishi | | 180/444 |
| 2007/0095597 A1 * | 5/2007 | Lim et al. | | 180/428 |

FOREIGN PATENT DOCUMENTS

| | | |
|---|---|---|
| EP | 0 470 424 A1 | 2/1992 |
| JP | 2001039330 | 2/2001 |
| KR | 20060071782 | 6/2006 |

* cited by examiner

*Primary Examiner*—Paul N. Dickson
*Assistant Examiner*—Barry Gooden, Jr.
(74) *Attorney, Agent, or Firm*—Morgan, Lewis & Bockius LLP

(57) ABSTRACT

A variable rack stroke system includes a rack housing in which a rack bar is slidably disposed, a casing attached to the rack housing, an annular rotary member, an annular stationary member, and a switch. The annular rotary member includes grooves on an inner periphery thereof that face each other, and first protrusions protruding from the rotary member in an axial direction that have different thicknesses. The rotational phase of the rotary member is adjusted by the motor. The annular stationary member includes protruding parts on an outer periphery thereof that face each other, configured to be inserted into the grooves, and second protrusions protruding from the stationary member in the axial direction, that have different thicknesses and face the first protrusions. The stationary member is coupled with a ball joint to be coupled with the rack bar. The switch adjusts the rotational phase of the motor.

4 Claims, 7 Drawing Sheets

VARIABLE RACK STROKE SYSTEM FOR VEHICLE

CROSS-REFERENCE TO RELATED APPLICATIONS

The present application is based on, and claims priority from, Korean Application Serial Number 10-2006-0108194, filed on Nov. 3, 2006, the disclosure of which is hereby incorporated by reference herein in its entirety.

FIELD OF THE INVENTION

The present invention relates to a variable rack stroke system for vehicle that can vary a rack stroke in several stages.

BACKGROUND OF THE INVENTION

In general, a variable rack stroke system adjusts the turning radius of a vehicle. In particular, when a steering wheel is fully turned, such as during a U-turn, the variable rack stroke system allows the vehicle to turn with a smaller turning radius by controlling the stroke of the rack bar.

The variable rack stroke system considers whether a snow chain is provided on a tire such that the space taken up by the snow chain between the wheelhouse and the tire can be used or not be used depending on whether the snow chain is provided on the tire. However, the space taken up by the snow chain is preset and does not take into account snow chains having various thicknesses.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a variable rack stroke system for vehicles that can adjust a rack stroke in several stages so as to correspond to the thickness of a snow chain provided on a tire. Accordingly, when snow chains having various thicknesses are provided on the tires, it is possible to optimally adjust the rack stroke. Further, a user can freely select from a variety of snow chains.

A variable rack stroke system for vehicles according to an embodiment of the present invention includes a rack housing in which a rack bar is slidably disposed, a casing attached to the rack housing, an annular rotary member, an annular stationary member, and a switch. The annular rotary member includes grooves on an inner periphery thereof that face each other, and first protrusions protruding from the rotary member in an axial direction that have different thicknesses. The rotational phase of the rotary member is adjusted by the motor. The annular stationary member includes protruding parts on an outer periphery thereof that face each other, configured to be inserted into the grooves, and second protrusions protruding from the stationary member in the axial direction, that have different thicknesses and face the first protrusions. The stationary member is coupled with a ball joint to be coupled with the rack bar. The switch adjusts the rotational phase of the motor.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
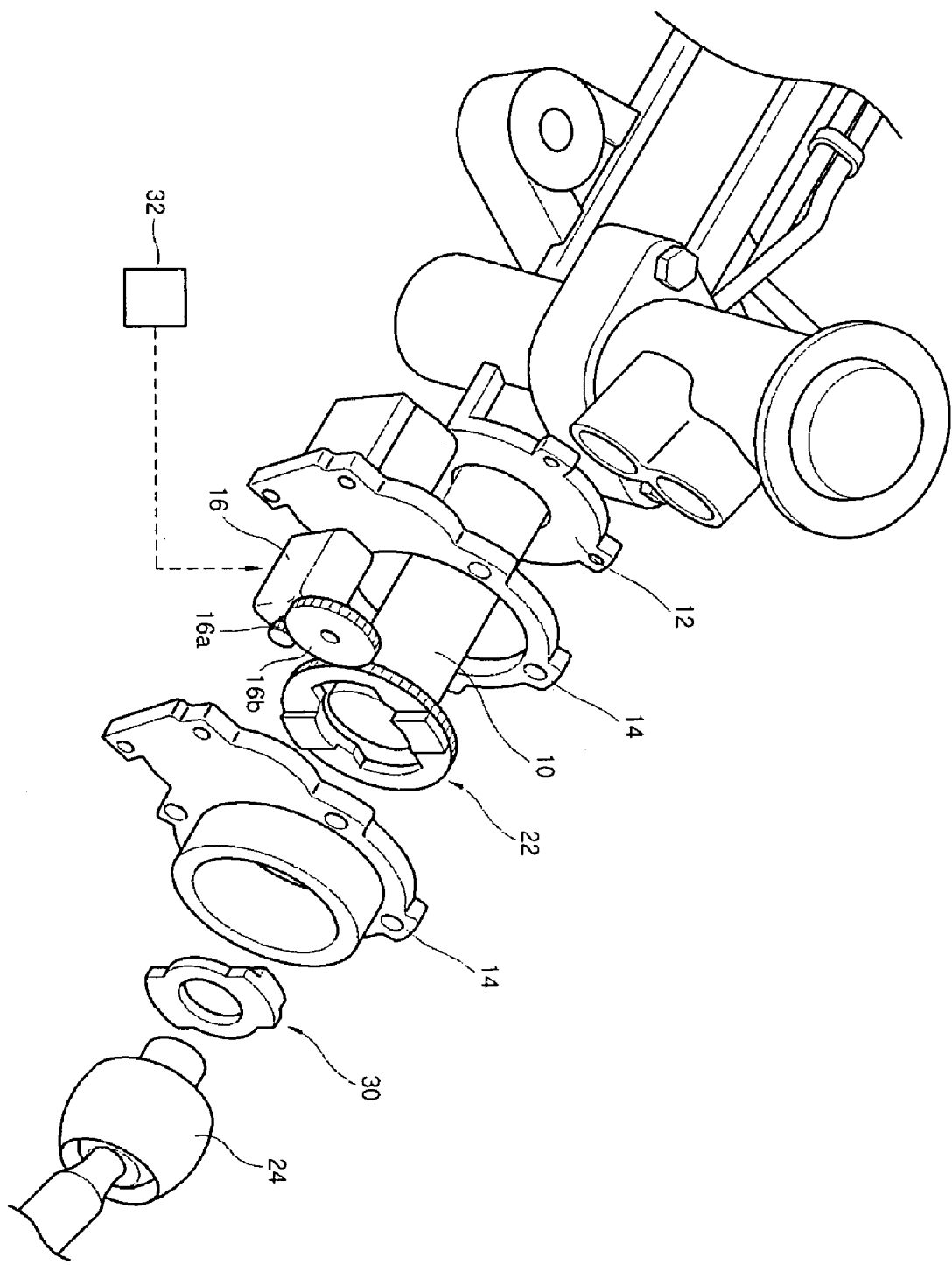
FIG. 1 is a perspective view of the structure of a variable rack stroke system for vehicle according to an embodiment of the present invention.
Figure 2:
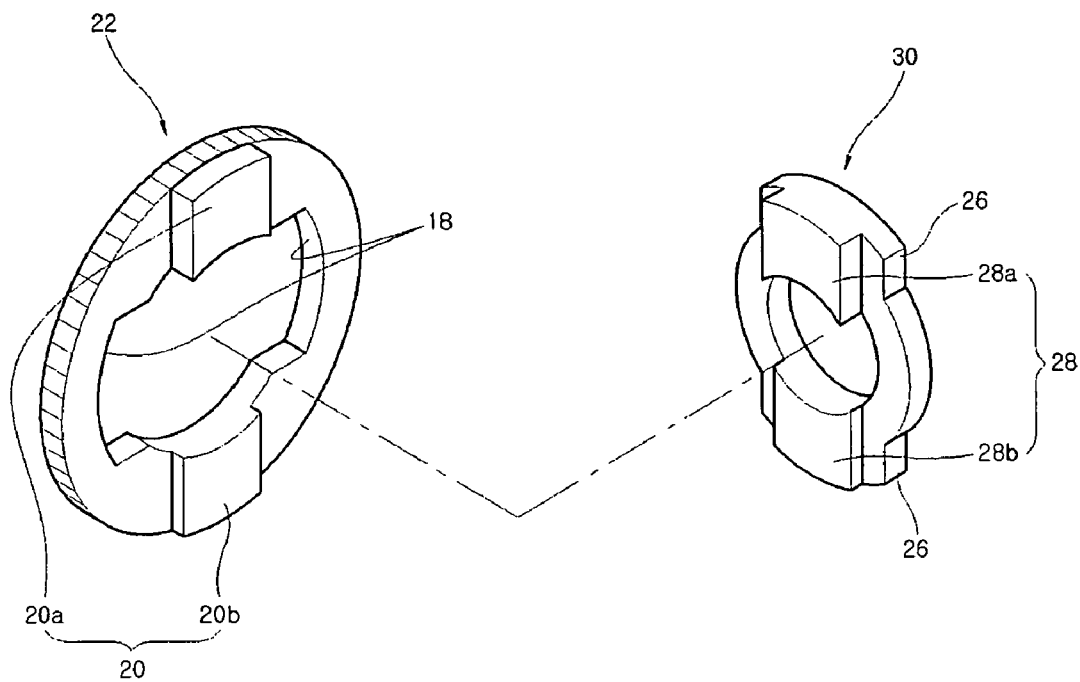
FIG. 2 is an exploded view of a rotary member and a stationary member as shown in FIG. 1.

As shown in FIG. 1, a variable rack stroke system for vehicles according to an embodiment of the present invention includes a rack bar 10, a rack housing 12, casings 14, a motor 16, an annular rotary member 22, an annular stationary member 30, and an operation switch 32. Rack bar 10 linearly moves to correspond to the operation of a steering wheel to perform steering, and rack bar 10 is movably received in rack housing 12. Casings 14 are attached to both ends of rack housing 12, and motor 16 is provided inside casings 14. The rotational phase of rotary member 22 is adjusted by the driving of motor 16. Referring also to FIG. 2, rotary member 22 includes grooves 18 that are formed on the inner periphery thereof in a radial direction so as to face each other, and first protrusions 20 that protrude therefrom in an axial direction and have different thicknesses. Stationary member 30 is coupled with a ball joint 24 to be coupled with rack bar 10. Further, stationary member 30 includes protruding parts 26 that are formed on the outer periphery thereof in a radial direction to face each other and to be inserted into grooves 18, and second protrusions 28 that protrude from stationary member 30 in an axial direction that have different thicknesses and face first protrusions 20. Operation switch 32 is used to adjust the rotational phase of motor 16 in a plurality of stages.

A driving gear 16*a* is provided on a rotary shaft of motor 16, and driving gear 16*a* meshes with a driven gear 16*b*, which meshes with rotary member 22.

In addition, grooves 18 and protruding parts 26 have the same size so that protruding parts 26 can be inserted into grooves 18. Stationary member 30 is thus inserted into rotary member 22.

Figure 3:
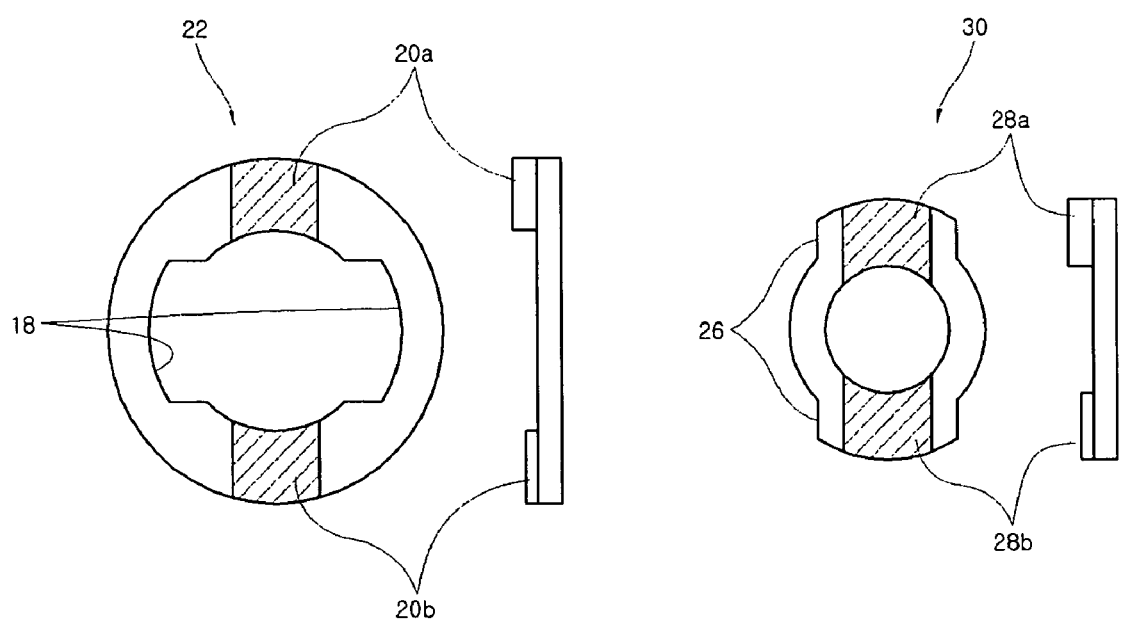
FIG. 3 is a cross-sectional view of a rotary member and a stationary member according to a first embodiment of the present invention.

As shown in FIG. 3, according to a first exemplary embodiment, first protrusions 20 are provided at portions where grooves 18 are not provided, and second protrusions 28 are provided at portions where protruding parts 26 are provided.

Figure 4:
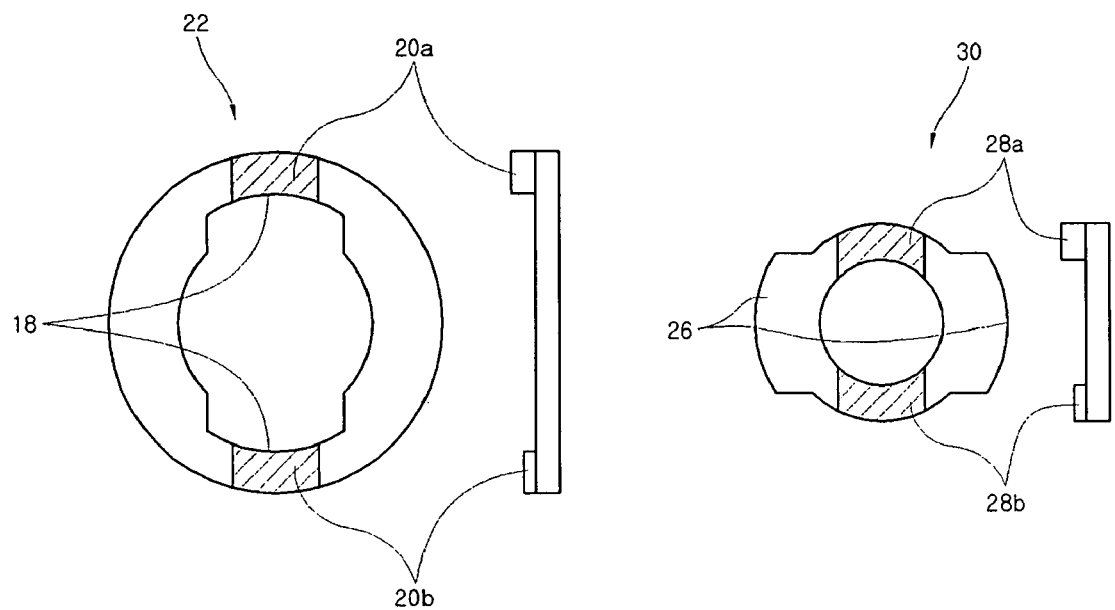
FIG. 4 is a view showing a rotary member and a stationary member according to a second embodiment of the present invention.

Further, as shown in FIG. 4, according to a second exemplary embodiment, first protrusions 20 are provided at portions where grooves 18 are provided, and second protrusions 28 are provided at portions where protruding parts 26 are not provided.

First protrusions 20 may include a plurality of protrusions that have different thicknesses. For example, first protrusions 20 may include a first thick protrusion 20*a* and a first thin protrusion 20*b*. First thick protrusion 20*a* and first thin protrusion 20*b* are disposed at positions which are separated from each other and correspond to phase angles opposite to each other in the radial direction.

Further, second protrusions 28 may include a plurality of protrusions that have different thicknesses. For example, second protrusions 28 may include a second thin protrusion 28b and a second thick protrusion 28a. Second thick protrusion 28a and second thin protrusion 28b are disposed at positions which are separated from each other and correspond to phase angles opposite to each other in the radial direction.

Hereinafter, the operation of the variable rack stroke system for vehicle according to an embodiment of the present invention will be described in detail.

When the variable rack stroke system is not operated, protruding parts 26 of stationary member 30 are inserted into grooves 18 of rotary member 22. In this state, the stroke of rack bar 10 is maximized, minimizing the turning radius.

Further, when the variable rack stroke system is operated, the stroke of rack bar 10 is adjusted through the following two steps.

Figure 5:
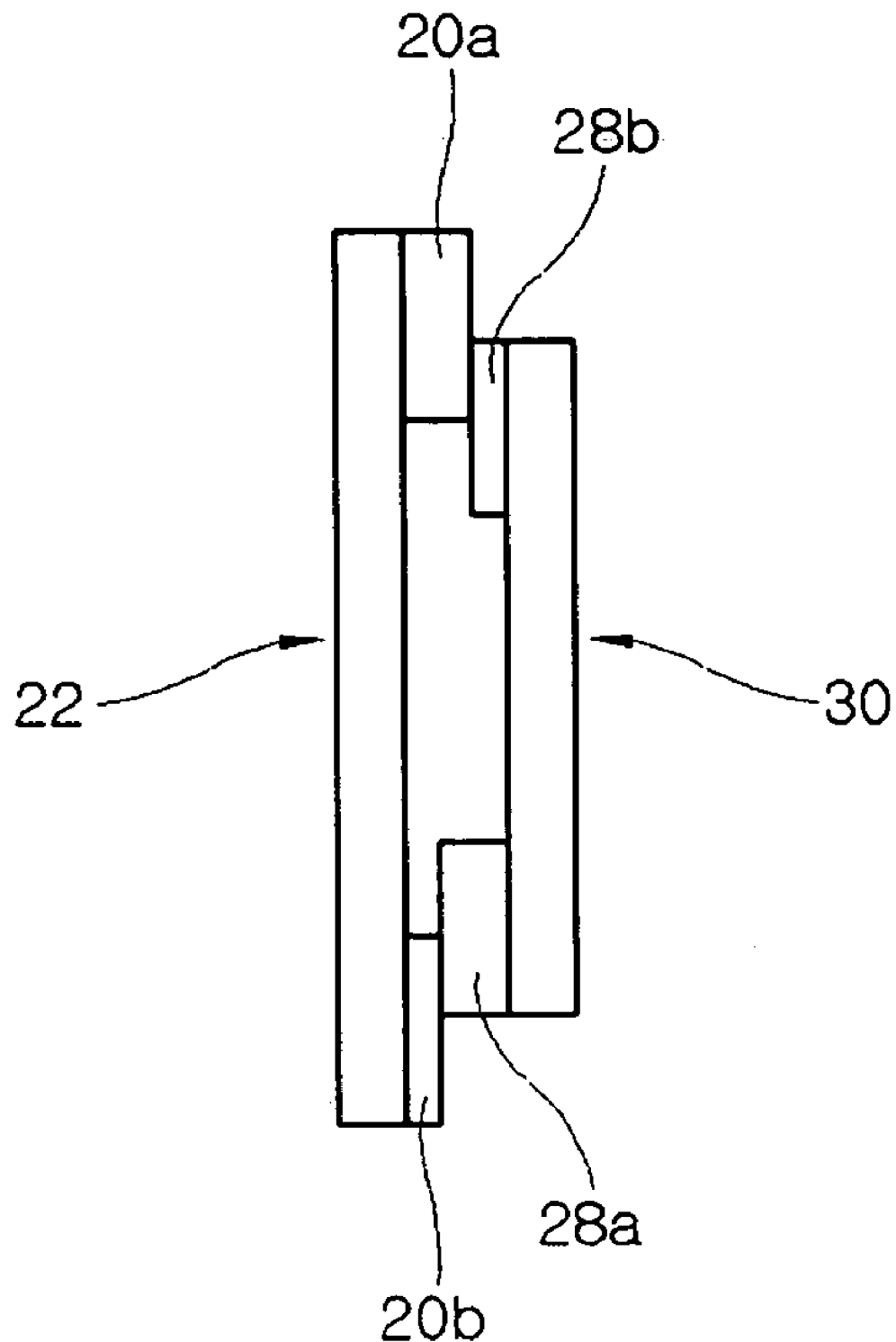
FIGS. 5 and 6 are side view of first protrusions and second protrusions facing each other when a rack stroke is adjusted.

First, motor 16 is driven by the switch 32. Then, rotary member 22 rotates due to the driving of motor 16, so that first thick protrusion 20a faces second thin protrusion 28b and first thin protrusion 20b faces second thick protrusion 28a, as shown in FIG. 5.

Accordingly, the stroke of rack bar 10 is smaller than that of the rack bar when the variable rack stroke system is not operated. As a result, the turning radius of the vehicle is greater than it is when the variable rack stroke system is not operated.

Figure 6:
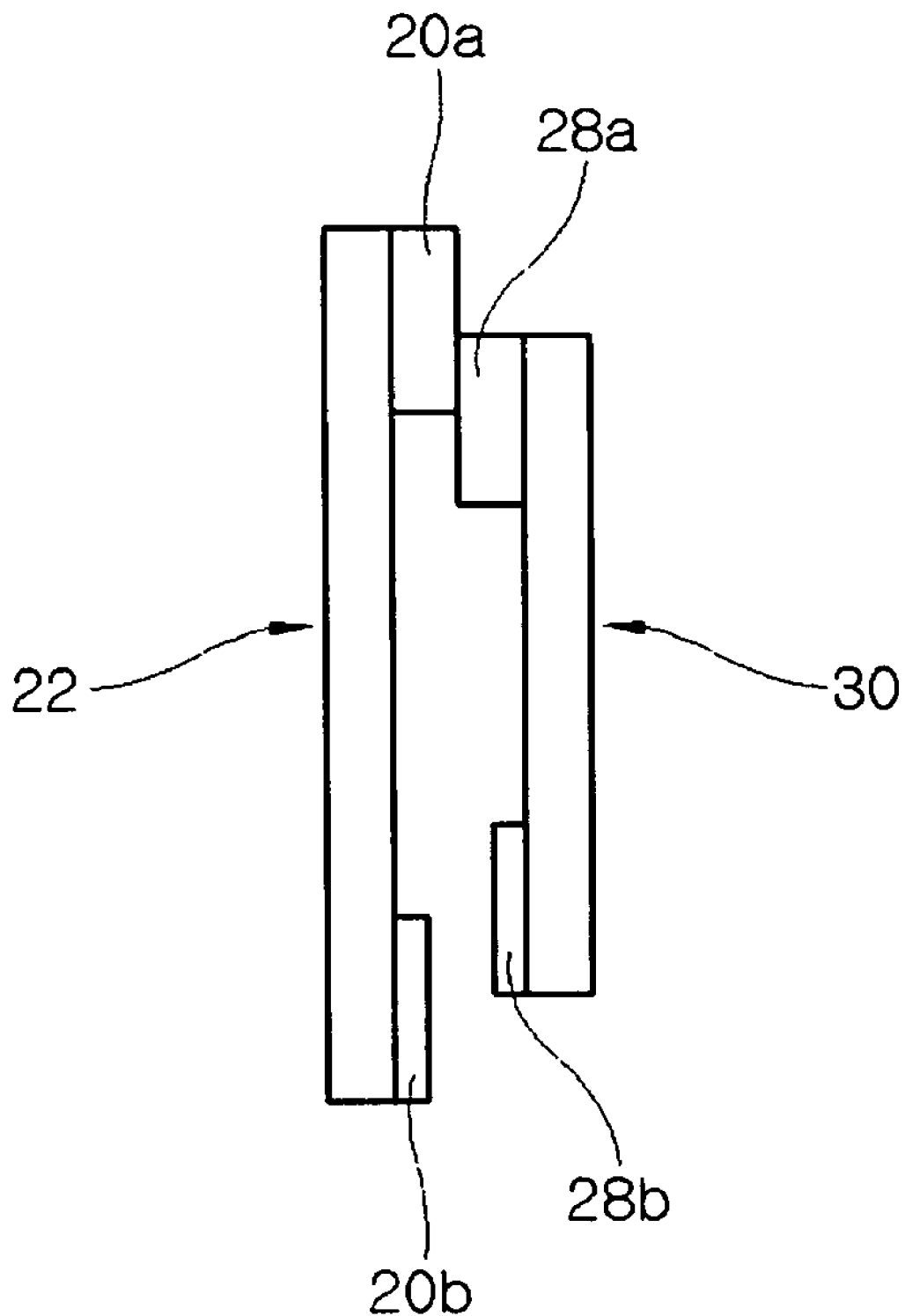

When the operation proceeds to a second step, motor 16 is driven by the switch 32. Rotary member 22 rotates due to the driving of motor 16, so that first thick protrusion 20a faces second thick protrusion 28a and first thin protrusion 20b faces second thin protrusion 28b with a gap therebetween, as shown in FIG. 6.

Accordingly, the stroke of rack bar 10 is smaller than that of the first step. As a result, the turning radius of the vehicle is further increased.

Figure 7:
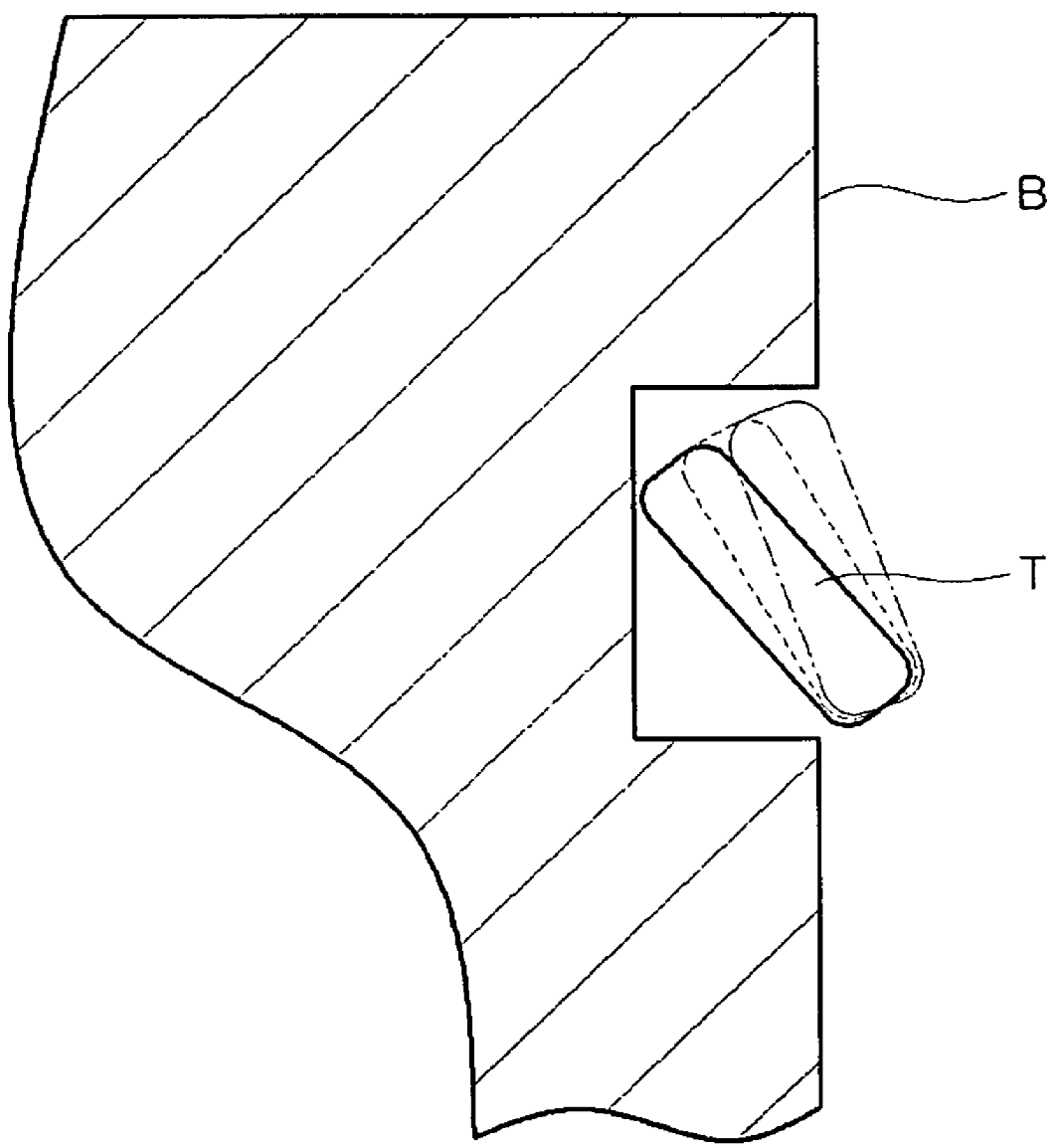
FIG. 7 is a view showing the maximum turning angles of a tire during the operation of the variable rack stroke system according to an embodiment of the present invention.

That is, when the variable rack stroke system is not operated, operated at the first step, and operated at the second step, rack bar 10 has three different strokes, leading to three different maximum turning angles as shown in FIG. 7: not operated (shown by a solid line), operated at the first step (shown by a dotted line), and operated at the second step (shown by a dashed dotted line).

As described above, since the rack stroke can be adjusted in several stages, a user can freely purchase snow chains regardless of their thickness.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A variable rack stroke system for vehicle, comprising:
 a housing;
 a rack bar slidably disposed in the housing;
 a motor;
 a rotary member, a rotational position of which is adjusted by the motor, comprising a groove on an inner periphery thereof and at least two first protrusions protruding from the rotary member in an axial direction apart from each other, wherein the at least two first protrusions comprise a first relatively thicker protrusion and a first relatively thinner protrusion;
 a stationary member coupled with a ball joint coupled with the rack bar, comprising protruding parts on an outer periphery thereof and selectively inserted into the groove, and at least two second protrusions protruding from the stationary member opposite the axial direction of the at least two first protrusions to abut with the at least two first protrusions when aligned therewith, wherein the at least two second protrusions comprise a second relatively thicker protrusion and a second relatively thinner protrusion; and
 a switch to adjust a rotational phase of the motor.

2. The system as defined in claim 1, wherein the at least two first protrusions are provided at portions of the rotary member spaced from the groove, and the at least two second protrusions are provided at portions extending onto the protruding parts.

3. The system as defined in claim 1, wherein the first relatively thicker protrusion and the first relatively thinner protrusion are disposed at positions which are separated from each other and correspond to phase angles opposite to each other in a radial direction.

4. The system as defined in claim 1, wherein the second relatively thicker protrusion and the second relatively thinner protrusion are disposed at positions which are separated from each other and correspond to phase angles opposite to each other in a radial direction.

* * * * *